US 12,509,255 B2

(12) United States Patent
Baumeister

(10) Patent No.: US 12,509,255 B2
(45) Date of Patent: Dec. 30, 2025

(54) VERTICAL FLOW-WRAPPER, BAG WITH A SEGMENT OF A RE-CLOSURE MEANS AND METHOD TO PRODUCE RE-CLOSABLE BAG

(71) Applicant: GEA Food Solutions Weert B.V., RV Weert (NL)

(72) Inventor: Bruno Gerfried Baumeister, Aachen (DE)

(73) Assignee: GEA FOOD SOLUTIONS WEERT B.V., Rv Weert (NL)

( * ) Notice: Subject to any disclaimer, the term of this patent is extended or adjusted under 35 U.S.C. 154(b) by 236 days.

(21) Appl. No.: 17/280,948

(22) PCT Filed: Oct. 14, 2019

(86) PCT No.: PCT/EP2019/077702
§ 371 (c)(1),
(2) Date: Mar. 29, 2021

(87) PCT Pub. No.: WO2020/078869
PCT Pub. Date: Apr. 23, 2020

(65) Prior Publication Data
US 2022/0041313 A1   Feb. 10, 2022

(30) Foreign Application Priority Data

Oct. 15, 2018 (EP) .................................. 18200439
Oct. 30, 2018 (EP) .................................. 18203365

(51) Int. Cl.
*B65B 9/12* (2006.01)
*B65B 9/08* (2012.01)
(Continued)

(52) U.S. Cl.
CPC .................. *B65B 9/12* (2013.01); *B65B 9/08* (2013.01); *B65B 9/2035* (2013.01); *B65B 61/188* (2013.01); *B65D 33/25* (2013.01)

(58) Field of Classification Search
CPC ........... B65B 9/12; B65B 9/08; B65B 9/2035; B65B 61/188; B65B 9/213; B65D 33/25
See application file for complete search history.

(56) References Cited

U.S. PATENT DOCUMENTS 4,355,494 A * 10/1982 Tilman ............... B29C 66/81465
53/139.2
4,709,533 A * 12/1987 Ausnit ................ B29C 66/4322
53/139.2
(Continued)

FOREIGN PATENT DOCUMENTS

| DE | 69502121 T2 | 12/1998 |
|---|---|---|
| EP | 0528721 A2 | 2/1993 |
| EP | 1894845 | 3/2008 |

OTHER PUBLICATIONS

International Search Report and Written Opinion for International Application PCT/EP2019/077702; mailed on Nov. 28, 2019.
(Continued)

*Primary Examiner* — Anna K Kinsaul
*Assistant Examiner* — Mobeen Ahmed
(74) *Attorney, Agent, or Firm* — The Dobrusin Law Firm, P.C.

(57) ABSTRACT

A vertical flow-wrapper with a form-fill-tube along which a film is transported in a transport direction and formed into a tube, a longitudinal-sealing means, which seals two opposing longitudinal ends of the formed film together to a longitudinal seal, and a cross-sealing means and a cutting means which provide cross seals to each package and separate the packages from each other and means to apply (Continued)

re-closure means to each package, arranged parallel to the longitudinal seal and as individual segments.

14 Claims, 3 Drawing Sheets

(51) Int. Cl.
  *B65B 9/20* (2012.01)
  *B65B 61/18* (2006.01)
  *B65D 33/25* (2006.01)

(56) References Cited

U.S. PATENT DOCUMENTS

| | | | | |
|---|---|---|---|---|
| 4,876,842 A * | 10/1989 | Ausnit | | B29C 66/4322 |
| | | | | 53/64 |
| 4,894,975 A * | 1/1990 | Ausnit | | B29C 66/7392 |
| | | | | 53/139.2 |
| 5,024,537 A * | 6/1991 | Tilman | | B65D 33/2525 |
| | | | | 383/203 |
| 5,215,380 A | 6/1993 | Custer et al. | | |
| 5,302,222 A * | 4/1994 | Larsen | | C09J 7/20 |
| | | | | 156/227 |
| 5,322,579 A | 6/1994 | Van Erden | | |
| 5,564,259 A * | 10/1996 | Stolmeier | | B65B 9/20 |
| | | | | 53/562 |
| 5,601,368 A * | 2/1997 | Bodolay | | B65D 33/2533 |
| | | | | 383/203 |
| 5,766,399 A * | 6/1998 | Clark | | B29C 66/43 |
| | | | | 383/905 |
| 5,776,045 A * | 7/1998 | Bodolay | | B29C 66/83421 |
| | | | | 493/215 |
| 5,782,733 A * | 7/1998 | Yeager | | B65D 33/2575 |
| | | | | 493/213 |
| 5,823,933 A * | 10/1998 | Yeager | | B65D 33/2575 |
| | | | | 493/213 |
| 6,003,582 A * | 12/1999 | Blohowiak | | B31B 50/00 |
| | | | | 493/213 |
| 6,098,369 A * | 8/2000 | Bodolay | | B29C 69/006 |
| | | | | 53/139.2 |
| 6,117,060 A * | 9/2000 | Bodolay | | B29C 69/006 |
| | | | | 493/379 |
| 6,151,868 A * | 11/2000 | Matthews | | B65B 9/22 |
| | | | | 53/139.2 |
| 6,212,857 B1 * | 4/2001 | Van Erden | | B65B 61/188 |
| | | | | 493/213 |
| 6,224,262 B1 * | 5/2001 | Hogan | | B65D 33/2583 |
| | | | | 383/203 |
| 6,361,212 B1 * | 3/2002 | Sprehe | | B65D 33/2533 |
| | | | | 383/65 |
| 6,461,044 B1 * | 10/2002 | Anderson | | B65D 33/20 |
| | | | | 383/211 |
| 6,471,818 B1 * | 10/2002 | Rapparini | | B65B 9/2028 |
| | | | | 493/200 |
| 6,553,744 B1 * | 4/2003 | Terminella | | B65B 9/2042 |
| | | | | 53/551 |
| 6,620,087 B1 * | 9/2003 | Plourde | | B31B 70/8133 |
| | | | | 53/139.2 |
| 6,656,297 B2 * | 12/2003 | Schneider | | B31B 70/00 |
| | | | | 156/308.2 |
| 6,786,640 B2 * | 9/2004 | Schneider | | B65B 61/188 |
| | | | | 383/204 |
| 6,792,740 B2 * | 9/2004 | Buchman | | B31B 70/8133 |
| | | | | 493/213 |
| 6,991,375 B2 * | 1/2006 | Clune | | B65D 33/24 |
| | | | | 383/203 |
| 7,325,378 B2 * | 2/2008 | Ausnit | | B65B 9/20 |
| | | | | 53/139.2 |
| 7,490,451 B2 * | 2/2009 | Matthews | | B65B 9/2042 |
| | | | | 53/139.2 |
| 8,353,147 B2 * | 1/2013 | Sprehe | | B29C 66/1122 |
| | | | | 53/550 |
| 8,858,077 B2 * | 10/2014 | Shepard | | B65D 31/10 |
| | | | | 383/203 |
| 9,061,783 B2 * | 6/2015 | Koenigkramer | | B65B 41/18 |
| 9,221,591 B2 * | 12/2015 | Moehlenbrock | | B65D 77/2096 |
| 9,260,214 B2 * | 2/2016 | Owensby | | B65D 33/24 |
| 10,065,770 B2 * | 9/2018 | Howell | | B65D 5/064 |
| 2002/0062925 A1 * | 5/2002 | Ausnit | | B31B 70/00 |
| | | | | 156/308.4 |
| 2003/0062109 A1 * | 4/2003 | Wright | | B29C 66/81427 |
| | | | | 156/218 |
| 2006/0207221 A1 * | 9/2006 | Ausnit | | B65B 9/023 |
| | | | | 53/412 |
| 2010/0061666 A1 * | 3/2010 | Sprehe | | B29C 66/474 |
| | | | | 493/213 |
| 2011/0243481 A1 * | 10/2011 | Goto | | B65B 61/188 |
| | | | | 428/343 |
| 2011/0249919 A1 * | 10/2011 | Shepard | | B65D 75/008 |
| | | | | 383/203 |
| 2014/0069061 A1 * | 3/2014 | Anzini | | B65B 11/004 |
| | | | | 53/450 |
| 2017/0233125 A1 * | 8/2017 | Brenkus | | B65B 61/188 |
| | | | | 53/416 |
| 2019/0337651 A1 * | 11/2019 | Otxoa-Aizpurua Calvo | | |
| | | | | B65B 51/303 |
| 2020/0407122 A1 * | 12/2020 | Namba | | B65B 51/303 |

OTHER PUBLICATIONS

International Preliminary Report on Patentability for International Application PCT/EP2019/077702; mailed on Sep. 10, 2020.

* cited by examiner

VERTICAL FLOW-WRAPPER, BAG WITH A SEGMENT OF A RE-CLOSURE MEANS AND METHOD TO PRODUCE RE-CLOSABLE BAG

The invention relates to improvements of a vertical flow-wrapper, for producing tubular bags from a foil web with re-closure means and the corresponding bag.

BACKGROUND

A common method of making bags out of a foil web is the use of a vertical flow-wrapper. Such a packaging machine receives a continuous flat sheet, a foil of plastic material, e.g. a thermoplastic material, which is transported continuously or intermittently and passed downwardly over a form shoulder and is then shaped into a tubular form, i.e. into a foil/film tube, by being wrapped around a vertical form-fill tube of the packaging machine. After being wrapped around the vertical form-fill tube, the foil web is longitudinally closed by means of a longitudinally extending seal which is applied to the foil especially by heat sealing the lateral/longitudinal margins of the foil web or by heat sealing in the vicinity of these margins thereby joining them. This is carried out by so called longitudinal-sealing means. The foil tube has conventionally a rectangular, elliptical, circular or other shaped cross-sectional area. Conventionally, the foil tube is closed by cross-sealing means, preferably in a direction perpendicular to the direction of flow, i.e. transversely. Thereby, individual bags are defined out of the continuous foil tube. A product, such as a foodstuff, is introduced by dropping the product through a form-fill tube and into the foil tube surrounding the form-fill-tube. During filling, the foil tube is transversely open at its upper end, i.e. not cross-sealed. Thereafter and/or simultaneously, the foil tube together with the product is moved downwardly and then a top cross-seal is formed above the product and thereby a hermetically closed bag produced. As a last step or simultaneously to the application of the top seal, the bag is separated from the foil tube by cutting means. According to the present invention, the vertical flow wrapper comprises means to apply re-closure means to each package, arranged parallel to the longitudinal seal. With these re-closure means, the bag can be reclosed after it has been opened by removing and/or opening the longitudinal seal. The re-closure means are normally applied to the film prior to providing the longitudinal seal.

SUMMARY

The purpose of the present invention is to improve the vertical flow-wrapper and/or the resulting bag.

The purpose is attained by providing a vertical flow-wrapper with:
- a form-fill-tube along which a film is transported in a transport direction and formed into a tube,
- a longitudinal-sealing means, which seals two opposing longitudinal ends of the formed film together to a longitudinal seal,
- and a cross-sealing means and a cutting means which provide cross seals to each package and separate the packages from each other and
- means to apply re-closure means to each package, arranged parallel to the longitudinal seal and as individual segments.

The disclosure regarding this embodiment of the present invention also applies to the other embodiments of the present invention. Subject matters from one embodiment can be incorporated into other embodiments and vice versa.

The present invention relates to a vertical flow-wrapper with a frame and/or a housing, which receives a continuous flat sheet, a foil of plastic material, e.g. a thermoplastic material, which is transported continuously or intermittently and passed downwardly over a form shoulder and then shaped into a tubular form, i.e. into a foil/film tube, by being wrapped around a vertical form-fill tube of the packaging machine. After being wrapped around the vertical form-fill tube, the foil/film web is longitudinally closed by means of a longitudinally extending seal which is applied to the foil especially by sealing, preferably heat sealing, the lateral/longitudinal margins of the foil web or by sealing in the vicinity of these margins thereby joining them. This is carried out by so called longitudinal-sealing means. The foil tube has conventionally a rectangular, elliptical, circular or other shaped cross-sectional area.

Conventionally, the foil tube is closed by cross-sealing means, preferably in a direction perpendicular to the direction of flow, i.e. transversely. Thereby, individual bags are defined out of the continuous foil tube. A product, such as a foodstuff, is introduced into the foil tube by dropping the product through a form-fill tube and into the foil tube surrounding the form-fill tube. During filling the foil tube is transversely open at its upper end, i.e. not cross-sealed. Thereafter and/or simultaneously, the foil tube together with its product is moved downwardly and then a top cross-seal is formed above the product and thereby the hermetically closed bag produced. As a last step or simultaneously to the application of the top seal, the bag is separated from the foil tube by cutting means.

According to the present invention, the vertical flow wrapper comprises means to apply re-closure means to each package, arranged parallel to the longitudinal seal. With these re-closure means, the bag can be reclosed after it has been opened by removing and/or opening the longitudinal seal. The re-closure means are normally applied to the film prior to providing the longitudinal seal.

The re-closure means preferably comprise closing means, such as a male and a female part or such as tongue and groove which are preferably provided as two parts, respectively. Each part of the closing means preferably comprises a flange, which is attached to the film.

The attachment of the re-closure means to the film can be carried out by gluing, sealing, tacking or the like.

Further according to the present invention, the re-closure means for each bag are applied to the film as individual segments, which are not connected to each other i.e. the re-closure segment for each bag is provided and attached to the film as an individual segment. Each segment is provided to the vertical flow-wrapper upstream from the longitudinal sealing means, relative to the transportation direction of the film. Preferably, the segments are provided in the vicinity of the form shoulder, but can also be provided in the area of the film feed.

According to a preferred embodiment of the present invention, the vertical flow-wrapper comprises cutting means, which cut the re-closure means provided as a strand into the individual segments. The strand is preferably provided on a reel, which is then cut into the individual pieces. These individual pieces are then attached to the film.

Preferably, transportation- and/or guiding-means are provided, which guide and/or move the individual segments individually prior and/during its application to the film. During transportation, the ends of the segments can touch each other. However prior and/or during to their application to the film, the segments are preferably separated from each other, so that there is a gap between two adjacent segments.

Preferably, the inventive vertical flow wrapper comprises heating means to heat the film and/or the re-closure means prior and/or during its application to the film.

The inventive or preferred embodiments of the vertical flow wrapper have the advantage, that other than the cutting the re-closing means need not to be machined. No stamping or the like needs to be done. No or very little of the re-closing means material is wasted. The quality and the optical appearance of the cross seals is improved.

The problem is also solved with a bag which comprises two opposing cross seals and one longitudinal seal opposite to the bottom of the bag and re-closure means provided parallel and adjacent to the longitudinal seal, wherein the length of the individual segment of the re-closure means is smaller than the length of the bag.

The disclosure regarding this embodiment of the present invention also applies to the other embodiments of the present invention. Subject matters from one embodiment can be incorporated into other embodiments and vice versa.

This embodiment of the present invention refers to a bag which is made from a film or a foil. The film is preferably made from a plastic material or comprises a plastic material. The film may comprise or may consist paper and/or a biodegradable material. The film/foil is provided as a flat material which is formed into a tube, which is filled with a packaging item, preferably a food-material. The bag is confined by two cross seals which are provided crosswise to the transport direction of the film/foil. Parallel to the transport direction of the film, a longitudinal seal is provided. The distance between the cross seals, preferably their outer edge defines the length of the bag.

The re-closure means is provided parallel and preferably adjacent to the longitudinal seal. According to the invention, the length of this re-closure means is now smaller than the length of the bag. Preferably, the length of the re-closure means do not extend into the area of the bag where the cross seals are provided, and even more preferred touches the cross seals or only a small gap between the cross seals and the ends of the re-closure means exists.

Preferably, the individual segment of the re-closure means comprises a flange and/or closure means, wherein neither the flange nor the closure means extend in the area of the cross seals.

Preferably, the individual segment of the re-closure means comprises a flange and/or closure means, wherein the flange and/or the closure means only extend a, small, preferably very small portion in the area of the cross seals. Preferably, the flange and/or the closure means extend to an extend into the cross seals that the two parts of the re-closure means are connected, by the cross seal and or by a connection of the two parts of the re-closure means. Preferably, the length by which the flange and/or the closure means of the re-closure means extend into the respective cross seal is 0-85%, preferably 5-70%, more preferably 10-50% of the width of this respective cross seal. The width of the cross seal is its extension in transport direction of the film.

Hence, the thickness of the bag in the area of the cross seals is at least partially constant which is advantageous for the quality of the cross seal.

The problem is also solved with a method to produce a re-closable bag comprising the following steps:
forming a plane film into a tube,
applying a longitudinal seal,
applying a lower cross seal,
filling the bag with a packaging item,
applying an upper cross seal,
wherein prior to applying the longitudinal seal, re-closure means are applied to the film as individual segments.

The disclosure regarding this embodiment of the present invention also applies to the other embodiments of the present invention. Subject matters from one embodiment can be incorporated into other embodiments and vice versa.

The re-closure means are preferably provided as a continuous strand, which is cut into individual pieces, which are subsequently spaced. Prior to the spacing, the adjacent ends of two individual segments may touch. However, prior and/or during the application of the individual segment to the film/foil of the respective bag, the individual segments are spaced from each other, wherein the distance between two segments is preferably approximately or exactly the difference between the length of the bag and the length of the segment.

BRIEF DESCRIPTION OF THE FIGURES

The invention is disclosed referring to the figures of the attached drawings, by way of non-limiting examples.

DETAILED DESCRIPTION

Figure 1:
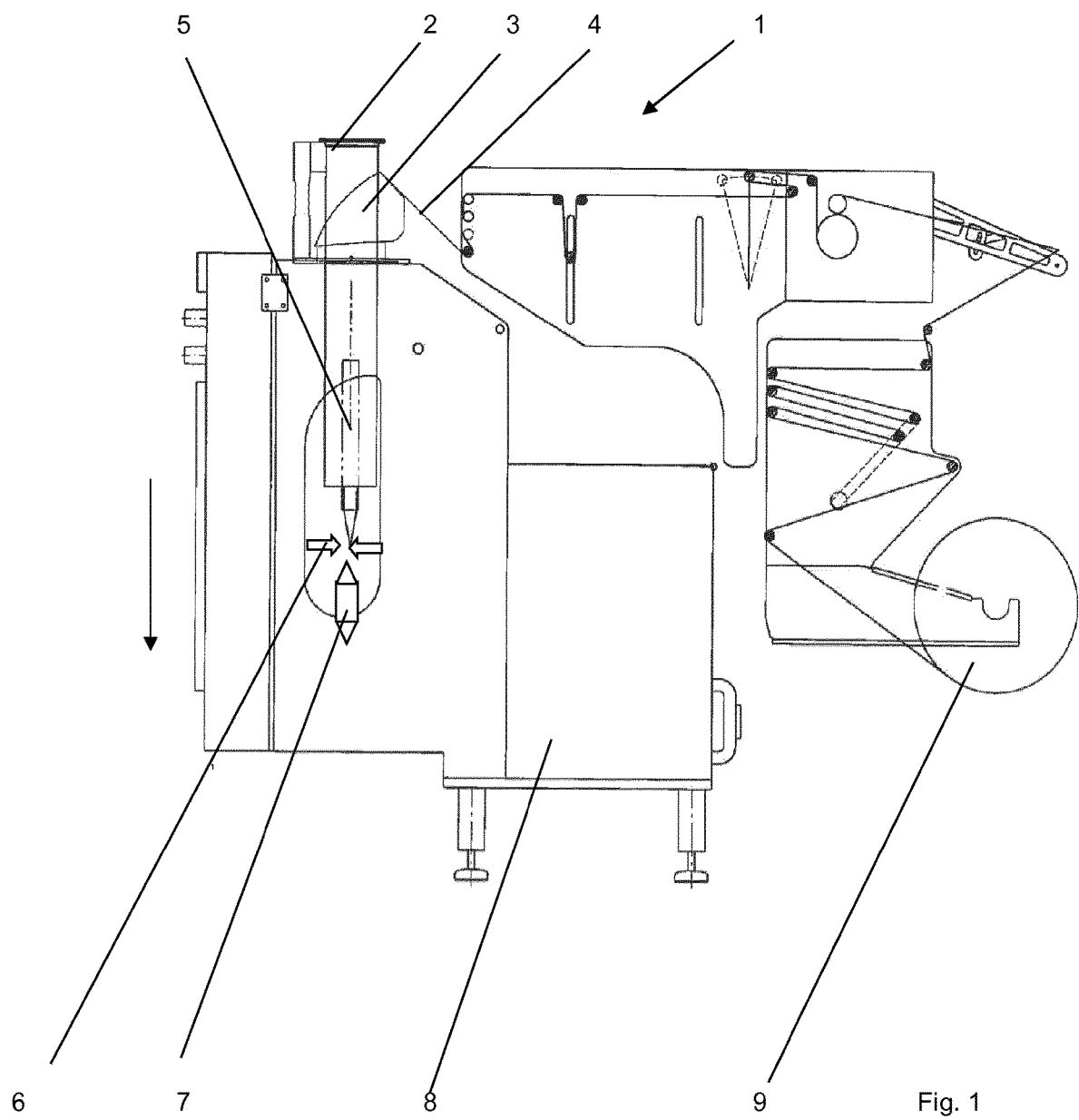
FIG. 1 shows schematically the vertical flow-wrapper according to the invention.

In FIG. 1, the vertical flow-wrapper 1 according to the invention is schematically shown and according to FIG. 1, the inventive method is described. A vertical flow wrapper is a packaging machine, which forms a plane foil/film (in the following foil) web into a foil tube, which is transported continuously or intermittently along a form-fill tube 2. Two ends of this foil tube are sealed together by a longitudinal sealing means 5. Subsequently, the packaging item is filled into the foil tube and a cross-seal 10 is applied to the foil tube to close the package. Simultaneously or after applying the cross-seal, the finalized packages are cut off the foil tube. The vertical flow wrapper comprises a frame/housing 8, at which a form shoulder 3, a form-fill tube 4 and longitudinal sealing means 5 and cross-sealing means 6 are provided. Furthermore, the inventive vertical flow wrapper comprises means to attach re-closure means for every bag, for example a zipper, to the foil, the re-closure means for each bag are provided parallel to the transport direction of the foil and/or parallel to the longitudinal seal 11. The means to attach the re-closure means to the foil is preferably provided upstream from the longitudinal sealing means 11. Upstream from the means to attach the re-closure means to the foil, means are preferably provided to cut a continuous strand of re-closure means into individual segments. These segments are transported to the attachment means and there one segment per bag is attached to the foil. During transportation and/or during attachment, the individual segments are preferably spaced from each other. The vertical flow-wrapper may comprise gusset-forming means to form the bottom and/or the top of each bag.

A web of a foil 4, especially a weldable plastic foil 4, is supplied from a reel, which supplies the plane foil continuously or intermittently to a form shoulder 3, which shapes the foil web into a rather tubular form around a form-fill tube 2. In the context of the present invention, a "tubular form" of the bags or of the foil means any cross-sectional form including a circular form or another form, and especially a rectangular or generally a polygonal form.

Longitudinal sealing means 5, which are provided downstream from the form shoulder, seal the edges to the foil tube together. After sealing, the bottom of the bag 7 can be formed by a special bottom forming means, for example gusset-forming means. Finally, cross seals, extending preferably perpendicularly to the direction of flow of the foil, are applied, especially by means of cross-sealing means 6. These cross sealing means 6 apply to the bag 7 not only a cross-seal closing the top of the bag 2, but these cross-sealing means 6 advantageously also provide, preferably simultaneously a cross-seal defining the bottom of the subsequent, upstream bag 2. The bags 2 produced are separated from one another by a cutting means, which are preferably incorporated into the cross-sealing means 6. Between the application of the bottom- and top-cross-seal of each bag, the bag is filled with the product, preferably an edible product. Parallel to the longitudinal seal, re-closure means for every bag, for example a zipper, is attached to the foil. The means to attach the re-closure means to the foil is preferably provided upstream from the longitudinal sealing means 11. Upstream from the means to attach the re-closure means to the foil, means are preferably provided to cut a continuous strand of re-closure means into individual segments. These segments are transported to the attachment means and there one segment per bag is attached to the foil. During transportation and/or during attachment, the individual segments are preferably spaced from each other. The vertical flow-wrapper may comprise gusset-forming means to form the bottom and/or the top of each bag.

Figure 2:
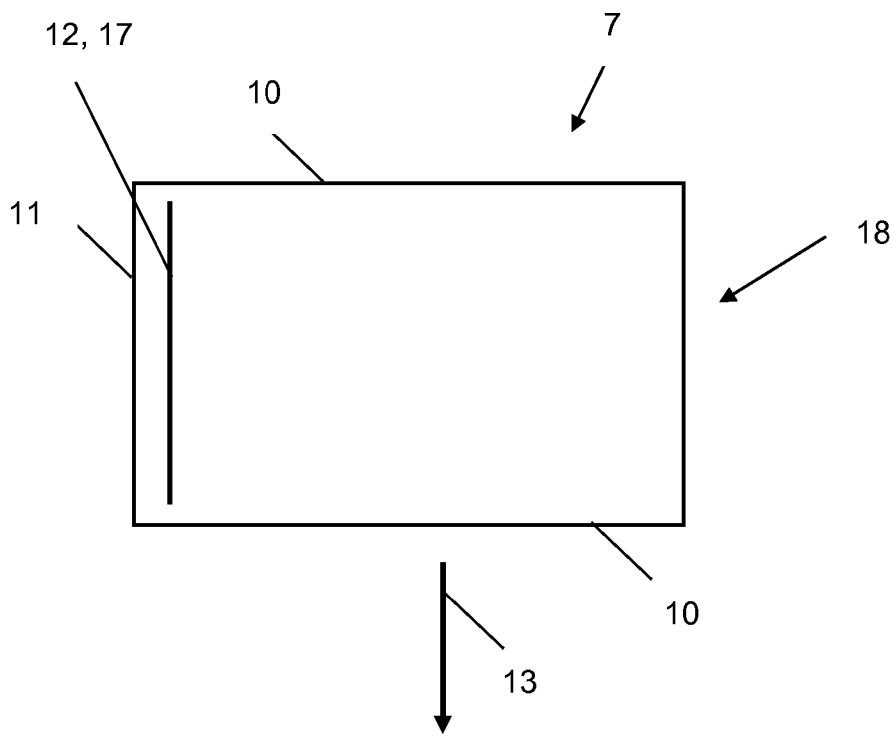
FIGS. 2-4 show details of the inventive bag
Figure 3:
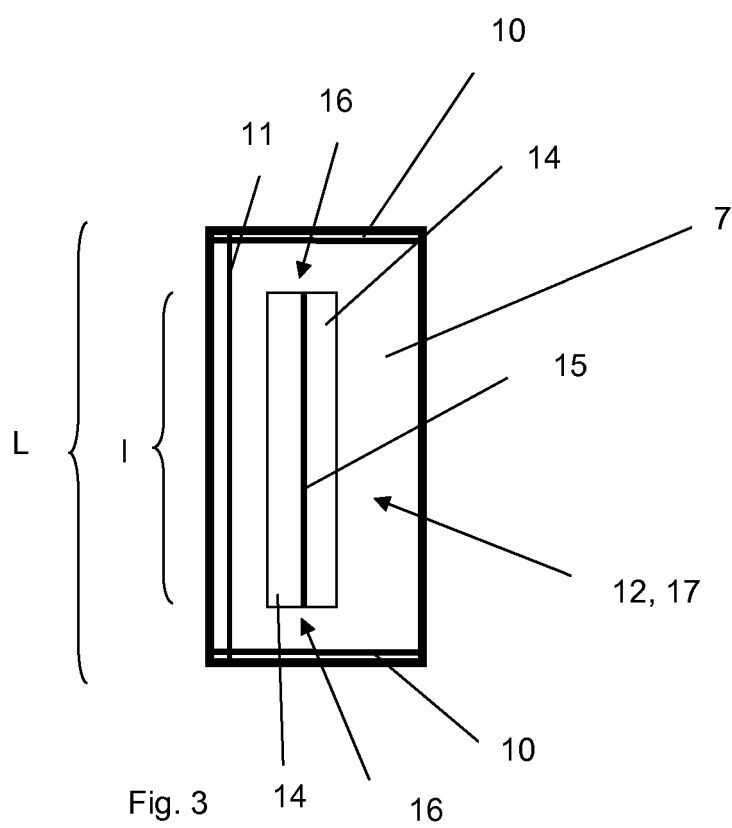
Figure 4:
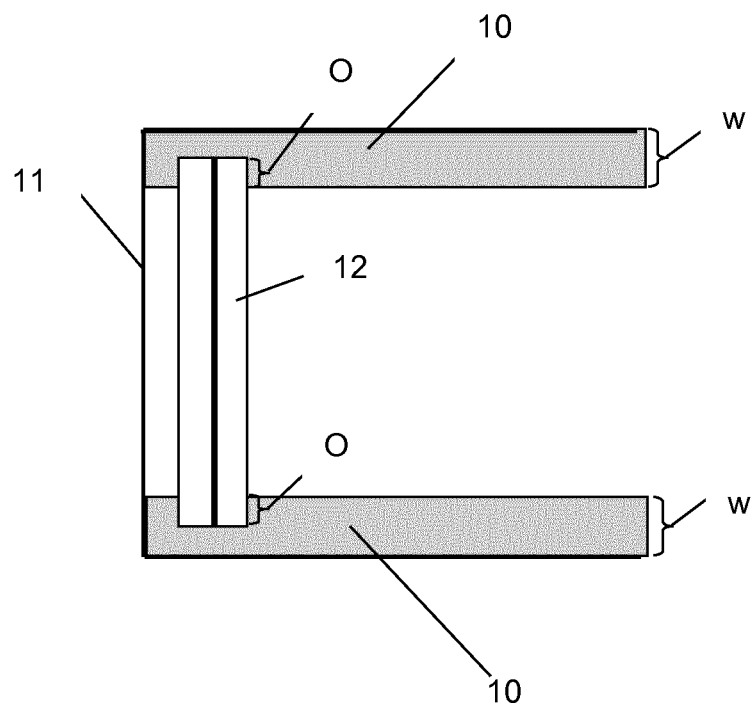

FIGS. 2-4 show the inventive bag 7, which can be produced by the inventive flow-wrapper and/or according to the inventive method. Arrow 13 depicts the transport direction of the foil. The inventive bag 7 comprises two cross seals 10, which are provided transversely to the transport direction 13 of the film. Parallel to the transport direction of the film and at the opposite end of the bottom 18 of the bag 7, a longitudinal seal 11 is provided. Adjacent to the longitudinal seal, a re-closure means 12 is provided, which allows to re-close the bag after the longitudinal seal has been removed and/or opened. The re-closure means 12 is provided as a segment 17, which is already a segment before it is attached to the foil. From FIGS. 2 and 3 it can be clearly seen that the length l of the re-closure means is smaller than the length L of the bag in transport direction. The bag 7 may comprise a gusset at its bottom 18.

Referring now particularly to FIG. 3, which shows details of the area of the bag 7 in which the re-closure segment 17 is provided. It can be seen that at both distal ends of the segment 17 of the re-closure means 12, there is an area 16 which is not covered by the segment 17. Preferably, this area is so large that the segment does not extend into the area of the cross seals 10. Preferably, the re-closure means comprise a closing mechanism 15, like a male- and a female part, and/or a flange 14, preferably a flange 14 on each side of the mechanism 15 and/or a flange at each part of the mechanism 15. The re-closure means 17 are preferably attached to the foil via the flange 14. Preferably, the flange 14 and/or the closing mechanism 15 does not extend into the cross-sealing area. Preferably, no machining other than the cutting has to be done to the re-closure means 12. Particularly, the mechanism 15 does not need to be stamped out in the area of the cross seals 10. In this preferred embodiment, the two parts of the re-closure means are preferably connected, preferably by sealing, in at least one distal end region, preferably in both distal end regions.

According to another preferred embodiment (not depicted), l is chosen such that the re-closure segment 17 extends into the cross seal, but only to a small extend, preferably 0.5-4 mm, more preferably 1-3 mm. Due to this small overlap, the two parts of the re-closure means maintain connected, even if the bag is opened.

The inventive bag has the advantage that re-closure material can be saved. No waste for machining the re-closure means occurs. The cross seals 10 have a at least nearly constant thickness their quality and/or their appearance is improved. The separation of the bags is easier, because the cutting means, which separate the bags need not cut through the re-closure means or the flange of the re-closure means.

Preferably, the overlap of the flange and/or the closure means of the re-closure means and the respective cross seal of each bag is 0-85%, preferably 5-70%, more preferably 10-50% of the width of this respective cross seal. This overlap can be in one or both cross seals of each bag. FIG. 3 depicts an embodiment with 0% overlap. In the embodiment according to FIG. 4, the overlap O is 50% of the width W of the respective cross seal.

LIST OF REFERENCE SIGNS 1 vertical flow-wrapper
2 form-fill tube
3 form shoulder
4 foil, film
longitudinal-sealing means
6 cross-sealing- and/or cutting means
7 package
8 frame/housing
9 reel
10 cross seal
11 longitudinal seal
12 reclosing means
13 transport direction of the film and/or package
14 flange
closing mechanism, male-/female-part
16 uncovered area
17 individual segment of the reclosing means
18 bottom of the bag
l length of the re-closure means
L length of the bag
O overlap
W width of the respective cross seal

The invention claimed is:

1. A vertical flow-wrapper comprising:
a form-fill-tube along which a film is transported in a transport direction and formed into a tube,
a longitudinal sealer, which seals two opposing longitudinal ends of the tube at a longitudinal seal, the longitudinal seal extends along the transport direction of the film,
a cross sealer, which provides opposing lateral cross seals to the film to produce a package, the opposing lateral cross seals extend transverse to the longitudinal seal,
a re-closure applier arranged upstream from the longitudinal sealer to apply a re-closure to the film, the re-closure is cut from a strand into individual segments, the individual segments are arranged parallel to the transport direction of the film, and then the individual segments are applied to the film such that the re-closure extends parallel to the longitudinal seal and perpendicular to the opposing lateral cross seals, and
a cutter that separates the package from other packages, the cutter is arranged on the vertical flow-wrapper to cut the film transverse to the re-closure and without cutting the re-closure that has been already applied to the package by the re-closure applier, wherein the re-closure has a length that is defined between two opposing ends of the re-closure, the length of the re-closure is less than a distance between the opposing lateral cross seals, and the re-closure is applied to the package by the re-closure applier so that a gap is defined between each of the two opposing ends of the re-closure and the respective opposing lateral cross seals after the re-closure is applied to the package.

2. The vertical flow-wrapper according to claim 1, wherein the vertical flow-wrapper comprises a second cutter, which cuts the re-closure from the strand into the individual segments.

3. The vertical flow-wrapper according to claim 1, wherein a transporter and/or guider is provided, which guides and/or moves the individual segments individually prior to and/during application to the film.

4. The vertical flow-wrapper according to claim 1, wherein the vertical flow-wrapper comprises a heater to heat the film and/or the re-closure prior to and/or during application to the film.

5. The vertical flow-wrapper according to claim 1, wherein the individual segments are located on the package in a region that is offset from and parallel to the longitudinal seal.

6. The vertical flow-wrapper according to claim 5, wherein the vertical flow-wrapper comprises a transporter and/or a guider, which moves and/or guides the individual segments prior to and/or during application to the package, wherein during the moving and/or guiding of the individual segments, ends of adjacent individual segments are in contact with each other, and prior to and/or during application of the individual segments to the package, the ends of the adjacent individual segments are spaced apart from one another so a gap is defined between two adjacent individual segments.

7. The vertical flow-wrapper according to claim 6, wherein a distance between the adjacent individual segments is the difference between a length of the package and a length of the individual segments.

8. The vertical flow-wrapper according to claim 6, wherein a length of the re-closure is smaller than a length of the package.

9. The vertical flow-wrapper according to claim 8, wherein the re-closure comprises two parts, and each of the two parts comprises a flange that is attached to the film.

10. The vertical flow-wrapper according to claim 9, wherein a distance between the adjacent individual segments is the difference between a length of the package and a length of the individual segments.

11. A method to produce a re-closable bag with a vertical flow-wrapper comprising the following steps:

forming a film into a tube on a form-fill-tube of the vertical flow-wrapper, applying a longitudinal seal to the film with a longitudinal sealer of the vertical flow-wrapper, the longitudinal seal extends along a transport direction of the bag, applying a lateral lower cross seal to the film with a cross sealer of the vertical flow-wrapper, the lateral lower cross seal is transverse to the longitudinal seal, filling the tube with a packaging item, applying a lateral upper cross seal to the film, the lateral upper cross seal is transverse to the longitudinal seal, wherein prior to the step of applying the longitudinal seal to the tube, the method comprises applying a re-closure to the film as an individual segment, wherein the re-closure is provided parallel to and adjacent to the longitudinal seal, and cutting the bag from other bags with a cutter of the vertical flow-wrapper the cutter is arranged to cut the film transverse to the re-closure and without cutting the re-closure that has been already applied to the film, wherein the re-closure has a length that is defined between two opposing ends of the re-closure, and the length of the re-closure is less than a distance between the lateral lower cross seal and the lateral upper cross seal, the re-closure is applied to the bag so that a gap is defined between each of the two opposing ends of the re-closure and the respective lateral lower cross seal and the lateral upper cross seal after the re-closure is applied to the bag.

12. The method according to claim 11, wherein a strand is cut into the individual segments, which are subsequently spaced.

13. The method according to claim 11, wherein the vertical flow-wrapper comprises a transporter and/or a guider, which moves and/or guides the individual segments prior to and/or during application to the bag, wherein during the moving and/or guiding of the individual segments, ends of adjacent individual segments are in contact with each other, and prior to and/or during application of the individual segments to the package, the ends of the adjacent individual segments are spaced apart from one another so a gap is defined between two adjacent individual segments.

14. The method according to claim 13, wherein a distance between the adjacent individual segments is the difference between a length of the bag and a length of the individual segments.

* * * * *